(12) United States Patent
Yang et al.

(10) Patent No.: US 10,634,794 B2
(45) Date of Patent: Apr. 28, 2020

(54) VEHICLE DYNAMIC OBSTACLE COMPENSATION SYSTEM

(71) Applicant: STMicroelectronics, Inc., Coppell, TX (US)

(72) Inventors: Xiaoyong Yang, San Jose, CA (US); Cheng Peng, Plano, TX (US); Jean-Marc Tessier, Coppell, TX (US)

(73) Assignee: STMICROELECTRONICS, INC., Coppell, TX (US)

( * ) Notice: Subject to any disclaimer, the term of this patent is extended or adjusted under 35 U.S.C. 154(b) by 341 days.

(21) Appl. No.: 15/444,801

(22) Filed: Feb. 28, 2017

(65) Prior Publication Data

US 2018/0246215 A1   Aug. 30, 2018

(51) Int. Cl.
| | |
|---|---|
| *G01S 7/48* | (2006.01) |
| *G01S 17/933* | (2020.01) |
| *B64C 39/02* | (2006.01) |
| *G05D 1/10* | (2006.01) |
| *G01S 17/87* | (2020.01) |
| *B64D 47/00* | (2006.01) |
| *G01S 17/10* | (2020.01) |

(52) U.S. Cl.
CPC .......... *G01S 17/933* (2013.01); *B64C 39/024* (2013.01); *B64D 47/00* (2013.01); *G01S 17/87* (2013.01); *G05D 1/101* (2013.01); *B64C 2201/027* (2013.01); *B64C 2201/123* (2013.01); *B64C 2201/141* (2013.01); *G01S 17/10* (2013.01)

(58) Field of Classification Search
CPC ........ G01S 17/933; G01S 17/87; G01S 17/10; B64C 39/024; B64C 2201/141; G05D 1/101; B64D 31/06

USPC ................................ 701/23, 96, 300; 901/47
See application file for complete search history.

(56) References Cited

U.S. PATENT DOCUMENTS

| | | | | |
|---|---|---|---|---|
| 9,377,533 | B2* | 6/2016 | Smits ...................... | G01S 7/497 |
| 9,753,126 | B2* | 9/2017 | Smits .................... | G01S 17/003 |
| 10,012,734 | B2* | 7/2018 | Sebastian ................ | G01S 17/08 |
| 10,067,230 | B2* | 9/2018 | Smits .................... | G01S 7/4808 |
| 10,274,588 | B2* | 4/2019 | Smits .................... | G01S 17/003 |

(Continued)

OTHER PUBLICATIONS

STSPIN32F0—Datasheet entitled "Advanced BLDC controller with embedded STM32 MCU," STMicroelectronics, 40 pgs., Sep. 2016.

(Continued)

*Primary Examiner* — Cuong H Nguyen
(74) *Attorney, Agent, or Firm* — Seed IP Law Group LLP

(57) ABSTRACT

The present disclosure is directed to an obstacle awareness device for vehicle systems. A threshold distance is set that identifies the range at which an obstruction interferes with fluid dynamics around and through at least one propulsion motor. One or more ranging sensors on the vehicle system detect relative position information of the obstruction when it is within the threshold distance. The relative position information is communicated to a controller, which adjusts a motor control signal to compensate for the obstruction interfering with the fluid dynamics around the at least one propulsion motor. The threshold distance may be defined by a three dimensional shape that encapsulated the vehicle system 100, and the three dimensional shape may change in shape or size with movement of the vehicle system.

27 Claims, 10 Drawing Sheets

(56) References Cited

U.S. PATENT DOCUMENTS

| | | | | |
|---|---|---|---|---|
| 10,324,187 B2* | 6/2019 | Smits | .................... | G01S 7/4815 |
| 10,379,220 B1* | 8/2019 | Smits | .................... | G01S 7/4814 |
| 10,451,737 B2* | 10/2019 | Smits | .................... | G01S 7/4808 |
| 2007/0221863 A1* | 9/2007 | Zipf | .................... | G01N 21/631 |
| | | | | 250/461.1 |
| 2013/0080019 A1* | 3/2013 | Isaji | ...................... | B60W 30/16 |
| | | | | 701/96 |
| 2015/0266472 A1* | 9/2015 | Ferguson | ........... | G01C 21/3461 |
| | | | | 701/23 |
| 2015/0338518 A1* | 11/2015 | Sebastian | ................ | G01S 17/08 |
| | | | | 356/4.01 |
| 2016/0221186 A1* | 8/2016 | Perrone | .................. | B25J 9/1661 |
| 2016/0299228 A1* | 10/2016 | Maleki | .................. | G01S 17/325 |
| 2017/0043767 A1* | 2/2017 | Khafagy | ............... | B60W 10/06 |
| 2017/0250805 A1* | 8/2017 | Kwiat | ................... | H04L 9/0822 |
| 2017/0253330 A1* | 9/2017 | Saigh | .................... | B64C 39/024 |
| 2018/0164429 A1* | 6/2018 | Tasovac | .............. | G01S 13/4445 |
| 2018/0370780 A1* | 12/2018 | Marsee | ..................... | B66F 9/20 |
| 2019/0280859 A1* | 9/2019 | Kwiat | ................... | H04L 9/0852 |

OTHER PUBLICATIONS

L6230—Datasheet entitled "DMOS driver for three-phase brushless DC motor," STMicroelectronics, 25 pgs., Aug. 2016.

* cited by examiner

VEHICLE DYNAMIC OBSTACLE COMPENSATION SYSTEM

BACKGROUND

Technical Field

The present disclosure is directed to a vehicle system for obstacle awareness and movement control compensation and, in particular, a system of ranging sensors that detects an obstacle within a certain distance to the vehicle system and adjusts a vehicle propulsion motor output based on proximity of the obstacle to the vehicle system.

Description of the Related Art

Autonomous, semi-autonomous, and piloted vehicle systems are becoming more and more popular. These vehicle systems range from unmanned aerial vehicles to remote control toy cars to self-driving passenger vehicles. Obstacle awareness is an issue that these systems face. For example, as an aerial vehicle approaches an obstacle, such as a wall, tree, or ceiling, the air flow from propellers on the vehicle affect the load and torque of all of the propellers associated with the aerial vehicle. This change in air flow can result in unwanted collisions or crashes. The magnitude of uneven, nonlinear load and torque on each propeller is inversely proportional to a distance from the obstacle.

BRIEF SUMMARY

The present disclosure is directed to a vehicle system with an obstacle compensation system that detects obstacles in proximity to the vehicle system within a threshold distance. This obstacle compensation system provides adaptive control of the vehicle system to either autonomously avoid a collision or provide a user with an opportunity to adjust the vehicle system to avoid a collision. In many remotely controlled vehicle systems, the user provides speed and position commands but is not warned if the system is approaching an object. The present disclosure incorporates ranging sensors on one or more surfaces of the vehicle system to provide accurate distance information about the vehicle system with respect to obstacles. The vehicle system also includes a controller with stored threshold distances that define a safety boundary for the vehicle system. If an obstacle is detected within one of the threshold distances, the controller can automatically adjust the vehicle system's speed or can notify the user. The notification may include a preliminary slow down to give the user time to respond and avoid a collision.

Each threshold distance is selected based on the distance at which obstacles affect fluid dynamics around the vehicle system. Sensors may be included on a variety of surfaces where the threshold distance may be different based on the different location of the sensor. The sensors form a three-dimensional zone around the vehicle that defines boundaries within with the system can respond to avoid a collision if an obstacle is within the three-dimensional zone. The obstacle compensation system provides an alert to an operator or commands the vehicle system to adjust a propulsion motor control signal based on a proximity to the obstacle. For example, the obstacle compensation system decreases power of a propulsion motor of the vehicle system when an obstacle comes into close proximity to the propulsion motor to avoid turbulence or adjust for varying thrust levels.

In one embodiment, the obstacle compensation system includes more than one sensor where the sensors have overlapping fields of view such that the obstacle compensation system can detect obstacles in any direction. In some embodiments, the sensors are laser time of flight sensors that may have multi-zone detection. Each sensor may be able to detect multiple distances, which will allow the system to detect curved obstacles, irregular obstacles, such as a tree, and flat obstacles, such as a wall. The system may be configured to adjust a speed based on the type of obstacle detected. For example, the system may have data stored that can identify the difference between a flat wall perpendicular to the multi-zone sensor and a tree that has many irregularly spaced distances. These different categories of types of obstacles may have different types of responses stored in the system to appropriately adjust for the type of obstacle identified by the multi-zone sensor.

These multi-zone sensors also give each sensor the capability to detect more than one distance to an obstacle from the time of flight sensor for more precise detection of distances or higher resolution. The multiple distance detection with multi-zone sensors or with a plurality of single zone sensors allows the threshold distance to be conceptualized as a virtual three-dimensional threshold boundary around the vehicle system. The obstacle compensation system determines distance between the obstacle and various parts of the vehicle system as part of this three dimensional modeling. The obstacle compensation system varies its output based on the distance between the various parts of the vehicle system and the obstacle. In addition, the threshold distance and threshold boundary is either fixed or dynamic, adjusting according to movement of the vehicle system.

DETAILED DESCRIPTION

In the following description, certain specific details are set forth in order to provide a thorough understanding of various embodiments of the disclosure. However, one skilled in the art will understand that the disclosure may be practiced without these specific details. In other instances, well-known structures associated with electronic components and fabrication techniques have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense; that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used in the specification and appended claims, the use of "correspond," "corresponds," and "corresponding" is intended to describe a ratio of or a similarity between referenced objects. The use of "correspond" or one of its forms should not be construed to mean the exact shape or size.

The present disclosure is directed to a system and a method to identify obstacles and adjust a speed of a plurality of propellers or motors of a moving vehicle when approaching an obstacle. The system includes a plurality of ranging sensors arranged at various locations on a body of the vehicle. In the simplest case, there is a single ranging sensor on one side of the vehicle, such as the bottom side. As the vehicle moves in a downward direction, the ranging sensor continuously monitors for an obstacle to appear within a threshold distance. If an obstacle is detected, the system is configured to either automatically adjust or give the user an opportunity to adjust to avoid a collision.

Figure 1:
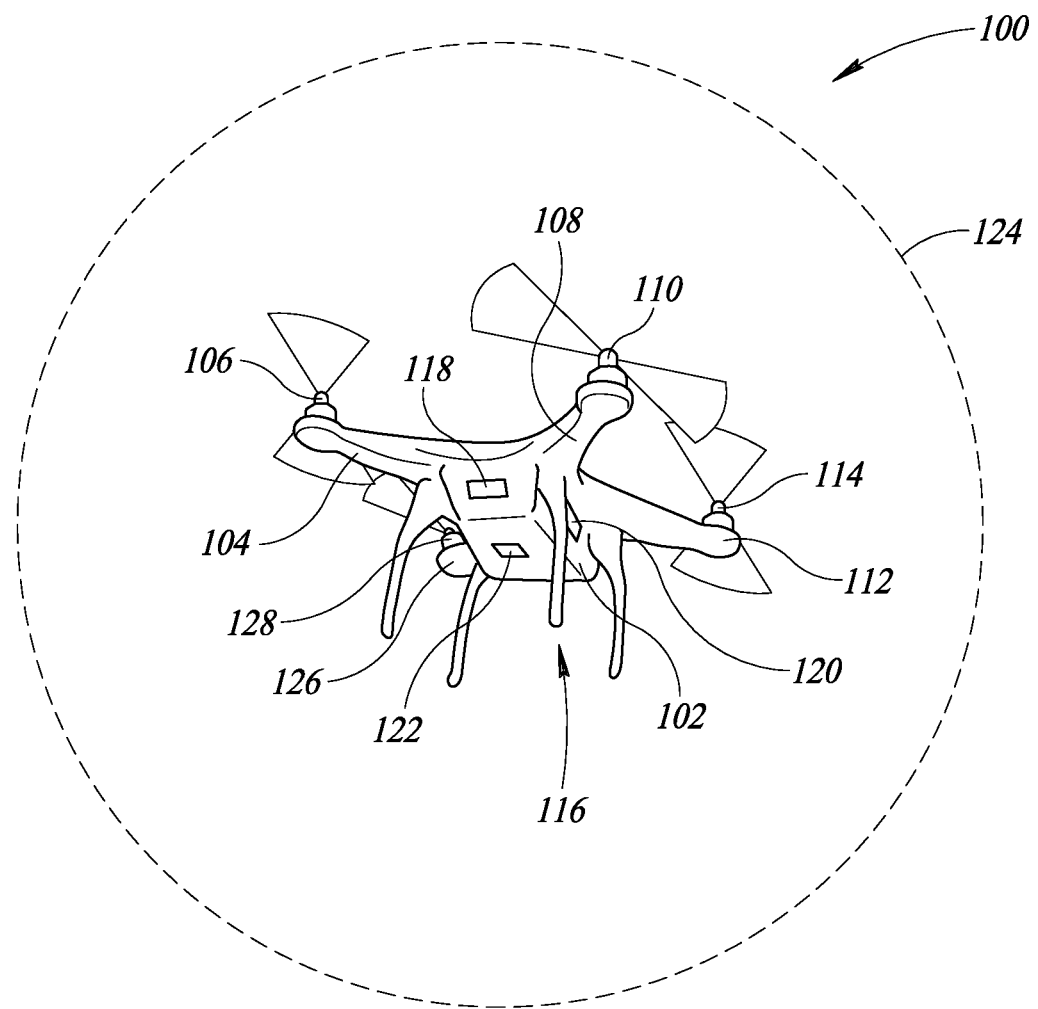
FIG. 1 is a perspective view of an exemplary embodiment of an aerial vehicle with an obstacle compensation system.

FIG. 1 is an example of an aerial vehicle system that includes an obstacle compensation system having a plurality of distance detection sensors that form a safety or threshold boundary 124 around the aerial vehicle. If the vehicle moves to a location where an object is within the threshold boundary, the obstacle compensation system can react and prevent a collision by adjusting one or more of a plurality of motors.

This aerial vehicle system 100 includes a main body 102 with four propulsion motors. The main body 102 has a first motor support or arm 104, a second motor support or arm 108, a second motor support or arm 112, and a fourth motor support or arm 126. The first motor support 104 projects from a first corner of the main body 102 and supports a first propulsion motor 106. The second motor support 108 projects from a second corner of the main body 102 and supports a second propulsion motor 110. The third motor support 112 projects from a third corner of the main body 102 and supports a third propulsion motor 114. The fourth motor support 126 projects from a fourth corner of the main body 102 and supports a fourth propulsion motor 128. The propulsion motors are shown as propeller driving electric motors, however other propulsion systems that create thrust by controlling flow of fluids can be used in other embodiments, such propeller combustion engines, turboprops, turbines, rockets, and any other fluid flow based motor or engine. Although shown as an aerial vehicle, the obstacle compensation system may be included in other types of vehicles, especially remote controlled vehicles, such as toy cars or boats.

Along the bottom of the main body 102 is a landing structure 116. The propellers and the landing structure form a physical boundary of the vehicle. This is the boundary that when crossed equates to a collision. The obstacle compensation system is configured to detect obstacles within a distance that gives the system sufficient time to avoid a collision with the physical boundary of the vehicle.

Obstacle compensation systems of the present disclosure can include any number of ranging sensors to detect obstacles and adjust propulsion motors as is useful for the associated vehicle. The vehicle system of FIG. 1 includes an obstacle compensation system having six ranging sensors coupled to a controller. Shown are three of the six ranging sensors: a first ranging sensor 118, a second ranging sensor 120, and a third ranging sensor 122. The ranging sensors each detect a range between the respective sensor and an obstacle to determine if an obstacle is closer than a threshold distance. The threshold distance for each sensor may be different as the adjustments and speed achievable in each direction may be different and the reaction times may be different.

The threshold distances as measured by each ranging sensor form a three dimensional threshold safety or obstacle-free boundary 124 around the vehicle system 100. In particular, when fields of view of the sensors are overlapping the threshold boundary can be visualized as a safety bubble or three-dimensional zone. In some embodiments, the ranging sensors are laser time of flight sensors. Together, the first, second, and third in conjunction with the ranging sensors that are not visible in FIG. 1 form a three dimensional shape around the obstacle compensation system based on the selected threshold distances for each sensor. In some embodiments the threshold boundary will be defined as a sphere or other three dimensional shape around the vehicle system 100. This virtual shield sphere or other three dimensional shape provides identification of threats to avoid.

While not shown, the vehicle system 100 includes an autopilot controller that can be activated by the obstacle compensation system in some embodiments. The controller receives output signals from each of the sensors, compares the output signals to stored threshold data, and controls the motors when the threshold requirements for detecting an obstacle are met.

As will be discussed in further detail later, FIGS. 2-10B are directed to various embodiments and configurations of the disclosure. Specifically, FIGS. 2-5 are directed to ranging sensor schematics and operation. In one embodiment, a ranging sensor includes a light which is emitted from a light source. The sensor detects the emission of the light source and reflections, if there are any. The obstacle compensation system records the time of the light emission and the detection of the reflection, and computes a distance of an object from the sensor based on the known speed of the light.

FIGS. 6A, 6B, 9A, 9B, 11, and 12 are directed to possible shapes of the obstacle detection threshold boundary. FIG. 7 is directed to the fluid dynamics impact of an obstacle in proximity to a propulsion motor. FIGS. 8A, 8B, 10A, and 10B are directed to operation of the vehicle system relative to an obstacle.

Figure 2:
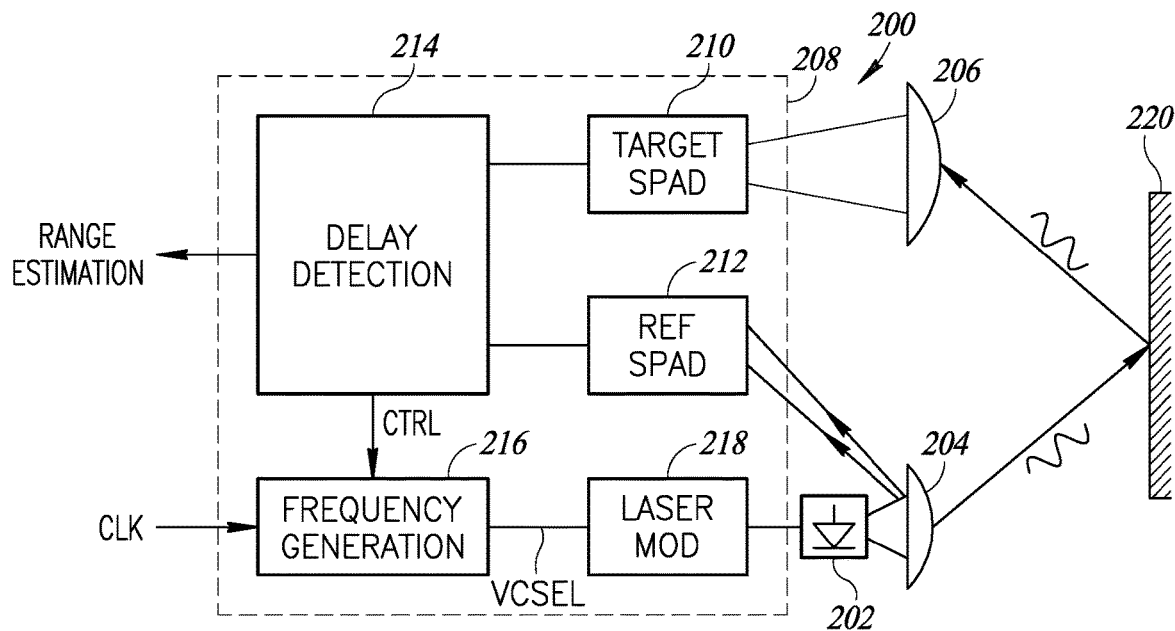
FIG. 2 is a schematic of a ranging sensor from an obstacle compensation system.

As in FIG. 2, a ranging device in the form of a single photon avalanche diode (SPAD) array can be utilized to implement the present disclosure, however, alternative ranging devices may be utilized. The principles of the described circuit and method for calculating a distance to an object could be applied to arrays formed of other types of photon detection devices or other range detection devices.

FIG. 2 schematically illustrates a ranging device 200 implementing a ranging function that can be used in conjunction with the obstacle compensation system. The device 200 includes a light source 202 that generates an optical signal, such as a beam of optical pulses, transmitted into the image scene via a lens 204. The optical signal propagates into the space visible to the sensor and reflects off any non-transparent surfaces. The reflection can be in the opposite direction as the propagation of the light from the light source as a return optical pulse. The return optical pulses are received via a further lens 206.

The range can be calculated using the return optical pulses. The ranging device 200 includes a range estimation circuit 208 that includes a reference SPAD and a target SPAD to record the optical pulses and to estimate the distance between the device 200 and an object 220 in the image scene against which the optical pulses reflect. The range estimation circuit 208 includes a target SPAD array (TARGET SPAD) 210, which receives the return optical pulses via the lens 206. The target SPAD array 210 includes an array of between 4 and several hundred SPAD cells.

The range estimation circuit 208 also includes a reference SPAD array (REF SPAD) 212, which is of the same dimensions or of smaller dimensions than the target SPAD array 210, and receives an internal reflection of the transmitted optical pulses. In some embodiments, the reference SPAD array 212 is a mono-dimensional array, having only a row or column of SPAD cells.

A delay detection circuit (DELAY DETECTION) 214 is coupled to the target SPAD array 210 and to the reference SPAD array 212, and estimates the delay between each transmitted optical pulse and the return optical pulse received by the target SPAD array 210, in order to provide a range estimation (RANGE ESTIMATION) of the object 220. The range estimation circuit 208 also includes a frequency generation circuit (FREQUENCY GENERATION) 216, which generates a voltage signal VCSEL provided to a laser modulation circuit (LASER MOD) 218 for generating a signal for driving the light source 202. The delay detection circuit 214 provides a control signal CTRL to the frequency generation circuit 216 for controlling the period of the signal VCSEL.

Figure 3:
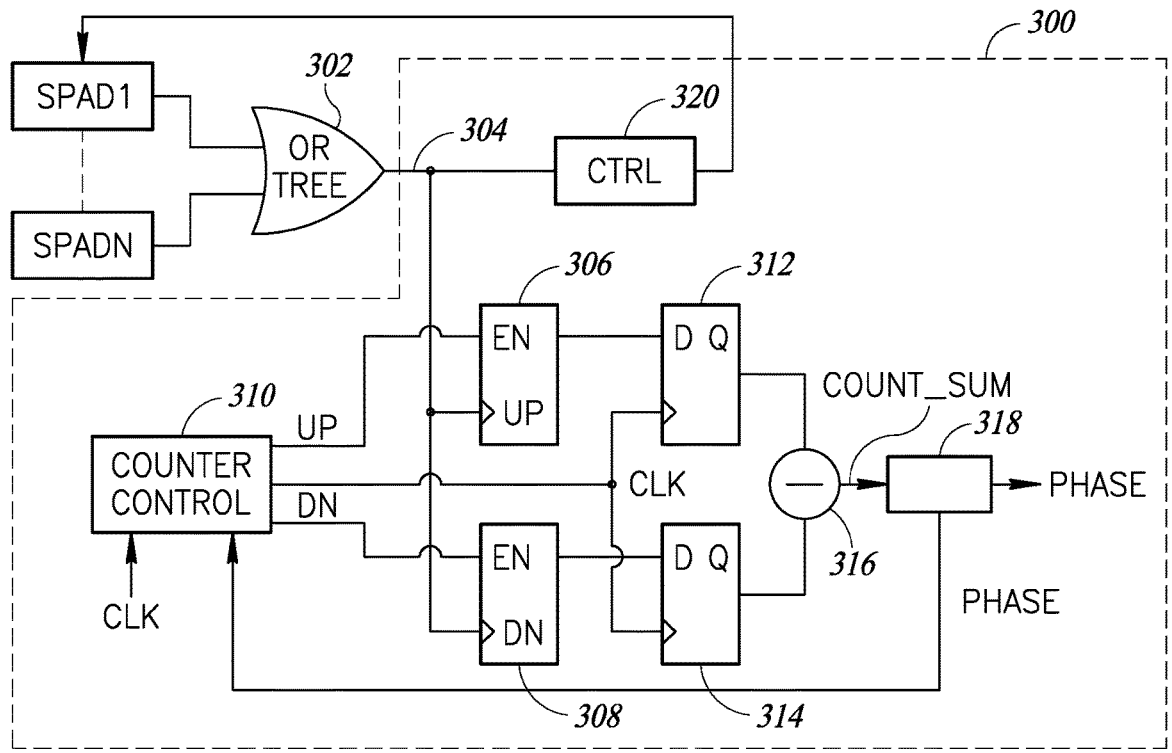
FIG. 3 is a schematic of a delay detection circuit of the ranging sensor.

FIG. 3 schematically illustrates a circuit 300 forming part of the delay detection circuit 214 of FIG. 2 in more detail according to an example embodiment in which the outputs of all of the SPAD cells of the target SPAD array 210 are combined onto a single line. In particular, an OR tree (OR TREE) 302 has inputs respectively coupled to the output of each of the SPAD cells SPAD1 to SPADN of the target SPAD array 210, and provides, on its output line 304, pulses generated each time an event is detected by any of the SPAD cells. In some embodiments, a control circuit 320 is coupled to the output line and to the SPAD array to control which one or more SPAD cell of the target SPAD array 210 is active.

The circuit 300 includes counters coupled to the output line 304 for counting the detected events. A clock signal CLK drives a counter control 310. The counter control in turn drives up counter (UP) 306 and down counter (DN) 308. The outputs of the counters are communicated to respective flip-flops 312 and 314, whose outputs are subtracted by subtraction unit 316 to produce a signal COUNT_SUM. A phase detection circuit 318 compares the signal PHASE from the counter control 310 and the signal COUNT_SUM to determine timing of the signal and output the signal PHASE. The phase signal is also used to control the timing of the signals UP and DN, as will be described in more detail below.

While not illustrated in FIG. 3, the delay detection circuit 214 further includes a circuit similar to the circuit 300 for generating a reference phase signal PHASE' indicating the timing of the center of each optical pulse received by the reference SPAD array 212. The delay detection circuit 214 estimates the time of flight of the optical pulses based on the time difference between the phase signals PHASE and PHASE'.

Figure 4:
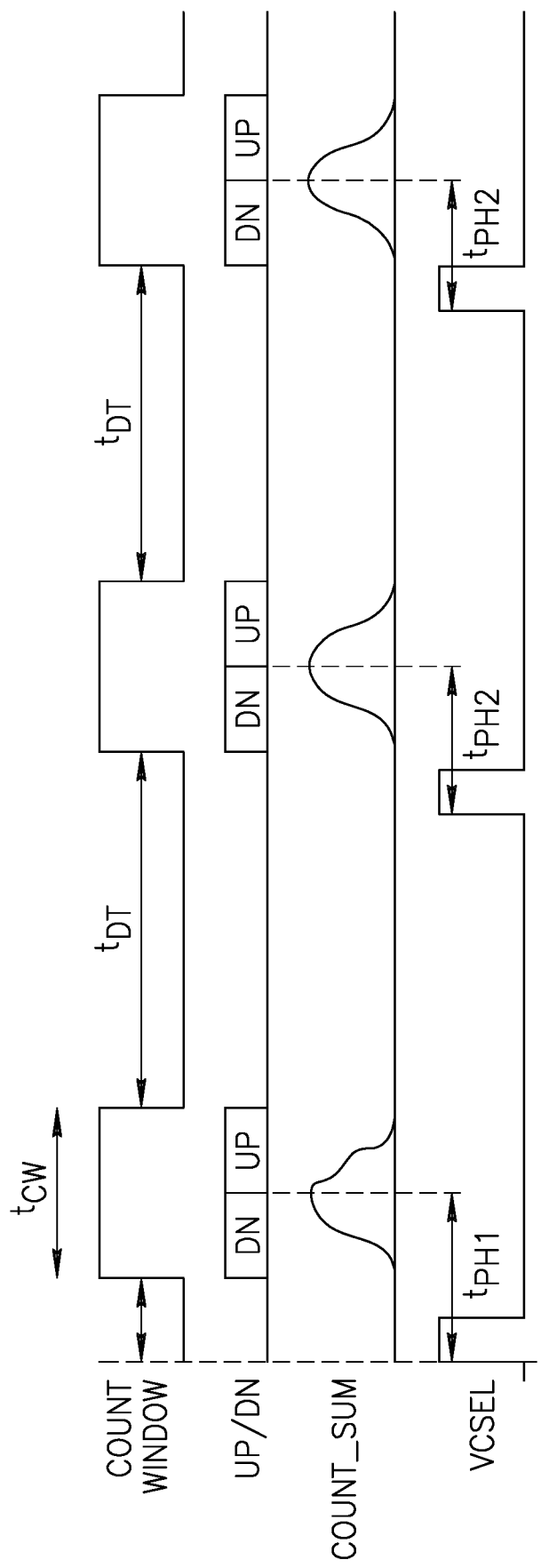
FIG. 4 is an exemplary timing diagram illustrating the generation of the optical pulses for the ranging sensor of FIG. 2.

FIG. 4 is a timing diagram illustrating examples of a count window (COUNT WINDOW) of the counters 306, 308 of FIG. 3, and the signals DN and UP controlling the counters 306, 308, the signal COUNT_SUM and the signal VCSEL used to generate the optical pulses.

The count window for each detection phase has a duration $t_{CW}$, and the count windows are separated by deadtime periods of duration $t_{DT}$ during which the counters 306, 308 are disabled. The sum of the durations $t_{CW}$ and $t_{DT}$ is equal to the optical pulse period, in other words the period of the signal VCSEL.

The signal DN is asserted during the first half of the count window, and the signal UP is asserted during the second half of the count window. The signal VCSEL is the signal used to generate the transmitted optical pulses. The phase signal PHASE generated by the circuit 318 indicates the timing of the center of the count window for a subsequent returned optical pulse, based on the difference COUNT_SUM between the down and up counts. The phase signal PHASE' is generated in a similar fashion based on the timing of the center of the count window for reference optical pulses, and the difference in time between the phase signals PHASE and PHASE' is thus used to estimate the time of flight of the optical pulse from the image scene.

In the example of FIG. 4 the signal VCSEL is a square-wave signal, and the generated optical pulses also form a square-wave. However, in alternative embodiments, the signal VCSEL used to generate the optical pulses, and the optical pulses themselves, could have other forms. In some examples, the optical signal is a periodic optical signal. For example, the signal VCSEL and the optical pulses could form a continuous sinewave signal, having peaks that correspond to the optical pulses, and troughs in which the optical signal falls to zero. In such a case, the period of the optical pulse signal would be the period of the sinewave. As further examples, the signal VCSEL and the optical pulses could be in the form of triangle or sawtooth waves in which the peaks of these signals form the optical pulses. Of course, while the optical signal is periodic in some case, in other cases the period varies from one cycle to the next, for example due to jitter, or because it has a varying pulse frequency over time.

Figure 5:
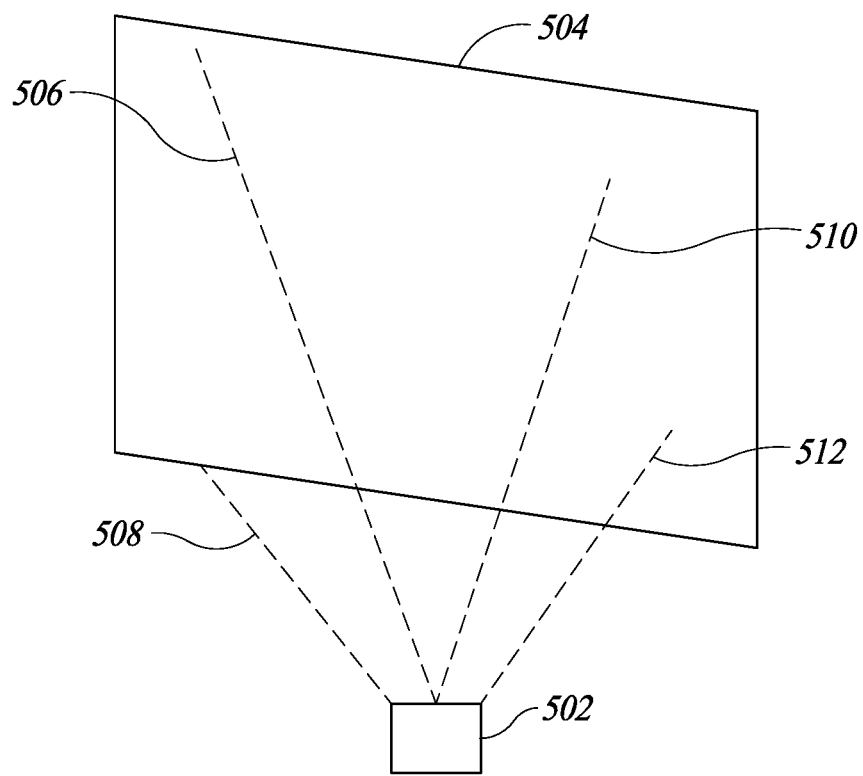
FIG. 5 is a perspective view of a ranging sensor having multi-zone detection and value outputs.
Figure 5:
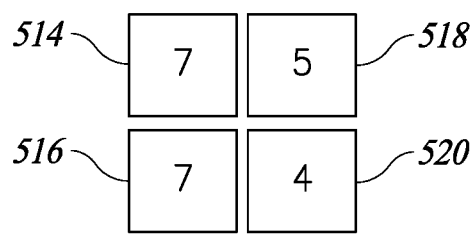

FIG. 5 illustrates a ranging sensor having multi-zone detection that can detect different distances with a single sensor. The ranging sensor 502 is shown directed towards the obstruction 504, which a angled planar surface (with a normal vector that is not parallel to a normal vector from the lens of the ranging sensor 502). Thus, different sections of the obstruction 504 are at different distances from the ranging sensor 502.

5 2 Multi-zone detection capabilities include hardware or software implemented capabilities. Exemplary hardware implementations include more than one detector sensor in each ranging sensor 502 or a lens system that points the detector sensor, the ranging light source, or both. Software implementations include data processing to isolate signals from a particular zone based on signal traits.

In FIG. 5, the ranging sensor 502 has a four zone detection capability. Other numbers of zones are possible, such as a 9 zone, a 12 zone, a 16 zone, etc. The zone detection is a uniform square in the embodiment of FIG. 5. In other embodiments the zone detection is a rectangle or any other shape based on the specific design of the ranging sensor 502, including arrangement of the photon detection cells in the array. Ranging sensor 502 is shown having a square zone detection shape. The square zone detection shape is divided into four equally sized squares. The zones each correspond to a plurality of cells in the array of ranging sensors. A first zone detection 506 is shown corresponding to a top left corner of the obstruction 504. A second zone detection 508 corresponds to a bottom left corner of the obstruction 504. A third zone detection 510 corresponds to a top right corner of the obstruction 504. A fourth zone detection 512 corresponds to a bottom right corner of the obstruction 504.

Each of the four zones determines the distance to the respective zone of the obstruction 504 from the ranging sensor 502. In some embodiments the zones are fixed with respect to the ranging sensor 502, and in other embodiments the zones are moved dynamically with respect to the ranging sensor 502 to highlight an area of interest for further inspection. As shown in FIG. 5, each of the four zones detects a portion of the obstruction 504. As the obstruction 504 is angled with respect to the lens of the ranging sensor 502, the different zones detect different differences, i.e. they do not have a uniform value for detected distance to the obstruction 504. For example, the first zone detection 506 is detected at a range associated with a first zone distance 514 having a value of 7. The second zone detection 508 is detected at a range associated with a second zone distance 516 having a value of 7. The third zone detection 510 is detected at a range associated with a third zone distance 518 having a value of 5. The fourth zone detection 512 is detected at a range associated with a fourth zone distance 520 having a value of 4. Thus, the ranging sensor detects the first and second zones to be at a distance associated with a value of 7, the third zone at a distance associated with a value of 5, and the fourth zone at a distance associated with a value of 4.

The decreasing values from the first and second zone distances 514, 516 to the third and fourth zone distances 518, 520 reflect how the left side of the obstruction 504 is farther from the ranging sensor 502 than the right side of the obstruction 504. Additionally, the difference between the third zone distance 518 and the fourth zone distance 520 reflect how the top right corner of the obstruction 504 is farther from the ranging sensor 502 than the bottom right corner. The difference between the third zone distance 518 and the fourth zone distance 520 not being reflected between the first zone distance 514 and the second zone distance 516 is due to the obstruction 504 not having a planar surface, due to hardware or software limitations, or due to some other reason.

The value for the zone distances 514, 516, 518, 520 are a true distance in one embodiment (e.g., 7 represents 7 units of measurement such as 7 centimeters). Alternatively, the value of 7 represents a normalized distance (e.g., a 7 out of 10 with 10 representing the maximum detection distance of the ranging sensor 502 and 0 representing the minimum detection distance of the ranging sensor 502). In another embodiment, the value of 7 represents a different unit of measure, such as time. The other zones are any of the different data types discussed. In one embodiment, all of the zones are of a similar data type, such as all outputting a true distance. These values can be output from the ranging device on separate output paths, which are received by the controller. Alternatively, there may be a single output terminal where the different outputs can be interpreted by the controller.

Figure 6A:
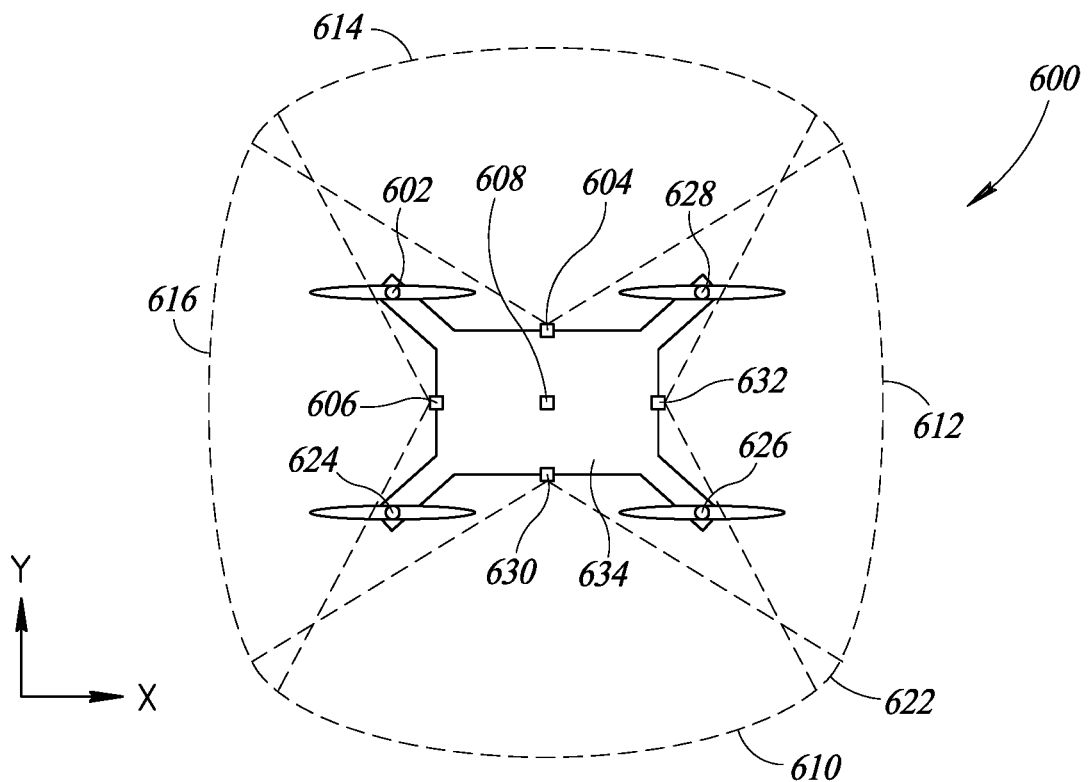
FIGS. 6A and 6B are a plan view and a side view of an aerial vehicle with a plurality of ranging sensors in the obstacle compensation system.
Figure 6B:
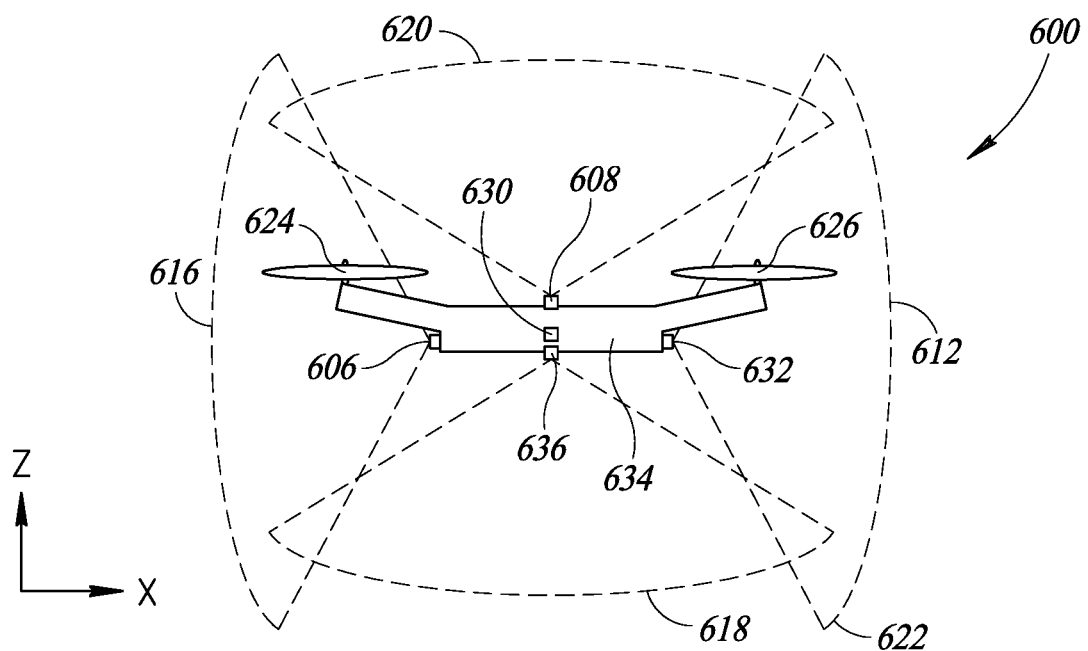
Figure 7:
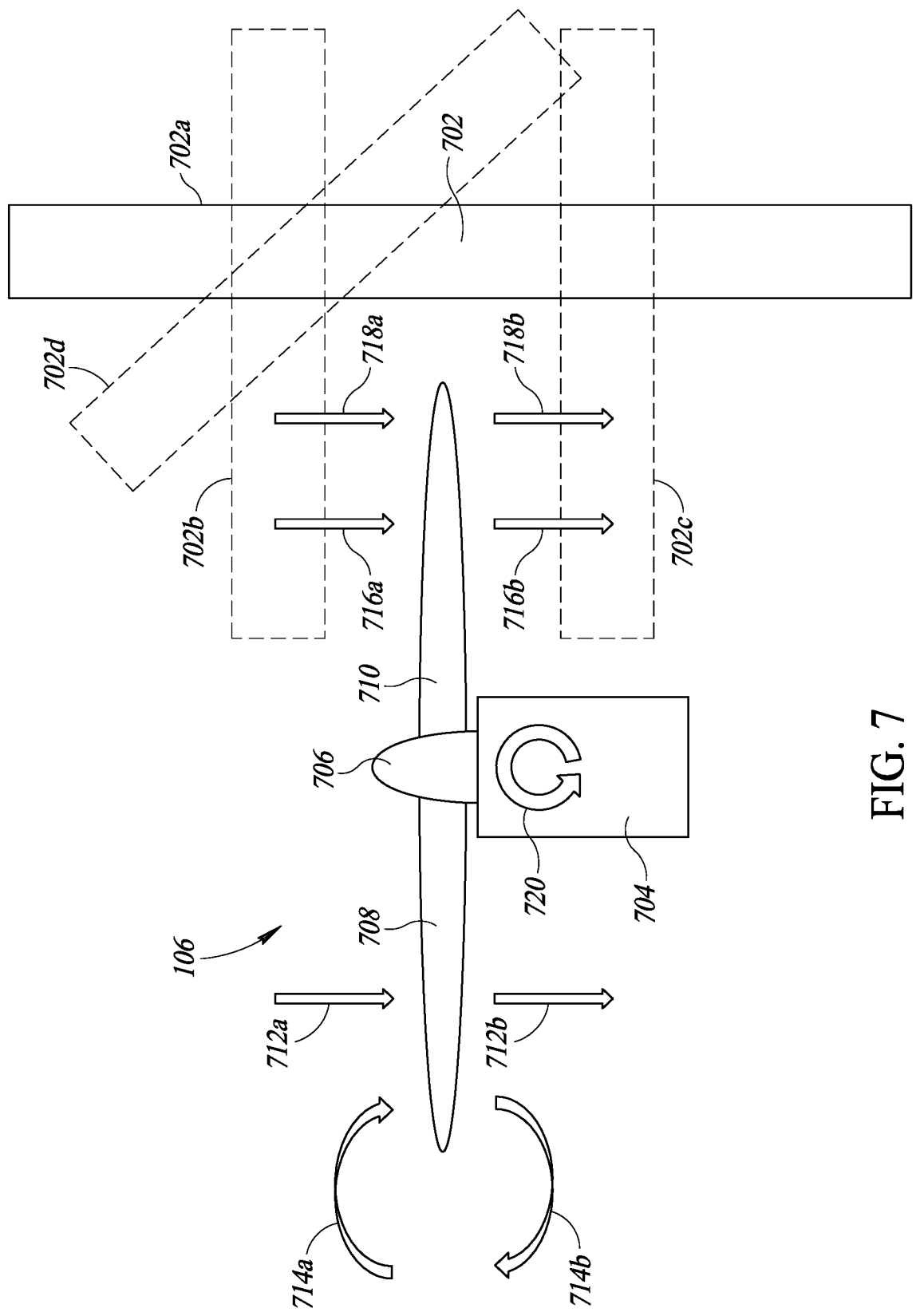
FIG. 7 is a side view of the fluid dynamics around a propulsion motor in proximity to an obstacle.

FIGS. 6A and 6B are a plan view and a side view of an alternative embodiment of a vehicle with a plurality of ranging sensors in an obstacle compensation system. FIG. 6A depicts a vehicle system 600 in an x-y plane of a Cartesian coordinate system. The vehicle system 600 includes a first propulsion motor 624, a second propulsion motor 626, a third propulsion motor 628, and fourth propulsion motor 602. In one embodiment, the propulsion motors shown in FIG. 6 are similar to the propulsion motors discussed with respect to FIG. 1. The first, second, third, and fourth propulsion motors 624, 626, 628, 602 are shown having symmetry along lines through the center of a body 634 of the vehicle system 600 and parallel to the X axis and Y axis. In other embodiments the vehicle system 600 has a different number of propulsion motors, and their position is anywhere along the vehicle.

Also shown in FIGS. 6A and 6B is a plurality of ranging sensors that includes a first ranging sensor 630, a second ranging sensor a third ranging sensor 636, a fourth ranging sensor 604, a fifth ranging sensor 606, and a sixth ranging sensor 608. In some embodiments the ranging sensors are laser time of flight sensors. In other embodiments, the ranging sensors are any ranging sensor type. Approximations of the field of view of the first, second, fourth, and fifth ranging sensors 630, 632, 604, 606 are shown in FIG. 6A. The first field of view 610 is shown projecting from the first ranging sensor 630. The second field of view 612 is shown projecting from the second ranging sensor 632. The third field of view 614 is shown projecting from the fourth ranging sensor 604. The fourth field of view 616 is shown projecting from the fifth ranging sensor 606. Each of the first, second, third, and fourth fields of view 610, 612, 614, 616 are shown having approximate boundaries which overlap with adjacent fields of view and terminate at approximately the same distance from its respective ranging sensor. The boundaries represent the threshold distance measured from each respective sensor. Alternatively, the boundaries can represent the threshold distance from the center of the vehicle to a point within the field of view of a respective sensor. In another embodiment, the boundaries can represent the threshold distance from any point or points, fixed with respect to the vehicle system 600 or not. In some embodiments, each sensor may have a 25 degree field of view. In other embodiments, the field of view for each sensor may be 70 degrees. These sensors with the larger fields of view may have 15 or more distance detection zones, which would give 15 distances measurements for a single sensor. The sensors in this disclosure may measure in the range of 1 and 16 distances in a single sensor.

The boundaries of the first, second, third, and fourth fields of view 610, 612, 614, 616 form a combined exterior boundary that resembles a squircle, a specific type of super-ellipse, in the two dimensional X-Y plane. The combined boundary represents a threshold boundary 622 from the vehicle system 600. The threshold boundary 622 represents a threshold distance from each respective sensor. Alternatively, the threshold boundary 622 represents a threshold distance from the center of the vehicle to a point within the field of view of a respective sensor. In another embodiment, the threshold boundary 600 can represent the threshold distance from any point or points, fixed with respect to the vehicle system 600 or not. While a squircle is shown, any curved, straight, patterned, irregular, or other shape represents the threshold boundary 622 in other embodiments. The threshold boundary is implemented as a hardware limitation representing the threshold for detection by a ranging sensor in one embodiment. In other embodiments, the threshold boundary 622 is implemented as a software solution to determine if an object has come within a specified distance of the vehicle system 100.

As can be appreciated from FIG. 6A, the ranging sensors have overlapping fields of view to provide complete coverage at the threshold boundary 622, but do not maintain complete coverage at points closer to the vehicle system 100. In other embodiments, the threshold boundary 622 has coverage gaps around the vehicle system 100. The coverage gaps in these embodiments are due to insufficient number of ranging sensors, aspects of the vehicle system obstructing the ranging sensor, or any other reason.

FIG. 6B depicts the embodiment shown in FIG. 6A, but in the X-Z plane of the Cartesian coordinate system. Approximations of the field of view of the second, third, fifth, and sixth ranging sensors 120, 122, 606, 608 are shown. The fifth field of view 618 is shown projecting from the third ranging sensor 122. The sixth field of view 620 is shown projecting from the sixth ranging sensor 608. Each of the second, fourth, fifth, and sixth fields of view 612, 616, 618, 620 are shown having approximate boundaries which overlap with adjacent fields of view and terminate at approximately the same distance from each respective ranging sensor. The threshold boundary 622 also defines the combined exterior boundary around the vehicle system 100 in FIG. 6B. Because of the position of the ranging sensors, the combined exterior boundary does not have a continuous two dimensional shape.

As can be appreciated from FIG. 6B, the ranging sensors have overlapping fields of view to provide complete coverage at the threshold boundary 622, but do not maintain complete coverage at points closer to the vehicle system 100. In other embodiments, the threshold boundary 622 has coverage gaps around the vehicle system 100. The coverage gaps are due to insufficient number of ranging sensors, aspects of the vehicle system obstructing the ranging sensor, or any other reason.

With FIGS. 6A and 6B taken together, the combined boundary defined by threshold boundary 622 roughly resembles a torus around a smaller ellipsoid. In other embodiments, other shapes are possible, such as those shown in FIGS. 11 and 12.

The threshold boundary 622 represents a maximum distance at which the controller of the obstacle compensation system will respond to detection of an object. In one embodiment, the threshold boundary 622 is the maximum detection distance of each respective sensor. In other embodiments, the threshold boundary 622 is defined by distances less than the maximum detection distance of each respective sensor. As an object approaches the vehicle system 600 one or more ranging sensors of the obstacle compensation system will detect the object. The obstacle compensation system can detect distance and also can detect position relative to the vehicle system 600. The position detection is from associating the detection with a specific sensor orientation in one embodiment. In other embodiments each ranging sensor has a multi-zone detection and adds additional position information to the distance information reported to the controller.

These multi-zone sensors can give the vehicle information about an angle of a landing surface. For example, if on a drone in a landing pattern, the sensor can provide information about the contours or angles of the landing zone. As such, the controller can accommodate and adjust the speed of the different propellers to allow for a smooth landing on this angled or contoured surface.

FIG. 7 is a side view of the fluid dynamics around a propulsion motor of the vehicle system 100 in proximity to an obstacle 702. The first propulsion motor 106 is illustrated by way of example, however the principles discussed below apply similarly to the other propulsion motors of the vehicle system 100 and to other variants of the propulsion motor. Fluid dynamics generally refers to the behavior of either a gas or a liquid over time. An obstruction 702 is shown as a rectangular wall. An obstruction is not limited to any particular size, shape, or object, but instead refers to any object that interferes with the flow of fluids around it. A wall is one of many examples of an object that interferes with the flow of fluid around it, as air or water is prevented from flowing through it and instead must follow a path that bends around it.

The obstruction 702 is shown in a side position 702a relative to a first propulsion motor 106. In alternate embodiments, the obstruction 702 is in a forward position 702b, a rear position 702c, or a canted position 702d. The distances depicted in FIG. 7 are exaggerated for better understanding. To better illustrate the airflow dynamics the obstruction 702 is shown at a distance from the second propeller blade 710 much less than the length of the second propeller blade, however the dynamics discussed below are still applicable when the obstruction 702 is at much greater distances than shown in FIG. 7. The effects described below with respect to the interaction between the obstruction 702 in the side position 702a and the first propulsion motor 106 similarly apply when the obstruction is in the forward position 702b, the rear position 702c, the canted position 702d, or in any position relative to the first propulsion motor 106 that is within sufficient proximity to disrupt the fluid dynamics around the first propulsion motor 106.

The first propulsion motor 106 is shown with a motor 704, a propeller hub 706, a first propeller blade 708, and a second propeller blade 710. The first and second propeller blades 708, 710 are each airfoils connected to the propeller hub 706 that are moved through the air by the spinning action of the propeller hub 706. The propeller hub is spun by the action of the motor 704, such has a rotational action generated by an electric motor or an internal combustion engine.

As the propeller hub 706 rotates, the first and second propeller blades 708, 710 will also rotate and switch positions with respect the orientation shown in FIG. 7. As the airfoils of the first and second propeller blades 708, 710 spin through a fluid such as air, areas of high and low pressure relative to the static pressure of the ambient environment are generated. These pressure differences cause a force to be exerted on the propeller in the direction towards the low pressure. The fluid dynamics are dependent on the position of the obstruction 702, not on which particular propeller blade is adjacent to the obstruction 702, thus the first propeller blade 708 is interchangeable with the second propeller blade 710 in the discussion below depending on the rotation of the propeller hub 706.

In FIG. 7, an area of low pressure forms forward of the first and second propeller blades 708, 710 and an area of high pressure forms to the rear of the first and second propeller blades 708, 710. For example, a first forward airflow 712a is pulled towards the first propeller blade 708 and a first rearward airflow 712b is expelled rearward from the first propeller blade 708, the first rearward airflow 712b being a continuation of the first forward airflow 712a. Because the air resists pressure differentials, the airfoil is pushed towards the low pressure area by the air trying to equalize in pressure. The air will try to equalize in every direction, thus air will flow into the low pressure area from the sides as well as from the front and rear of the first propeller blade 708. The air flowing in from the sides causes a vortex.

A second forward airflow 714a exists further from the propeller hub than the first forward airflow 712a and is shown exhibiting this vortex. The second forward airflow 714a flows into a low pressure area forward of the first propeller blade 708 which itself causes a low pressure area to the side of the first propeller blade 708. The flow is then expelled rearward as the second rearward airflow 714b by the movement of the first propeller blade 708. Because there is a low pressure area to the side of the first propeller blade 708, the second rearward airflow 714b turns to the side and enters the low pressure area created by the second forward airflow 714a to the side of the first propeller blade 708. With the airflow circling from the second forward airflow 714a to the second rearward airflow 714b, the vortex is generated. The vortex does not resist the pressure differential as much as the first forward airflow 712a and the first rearward airflow 712b, thus energy is lost by spinning the air in the vortex without generating the same forward force as compared to the first forward airflow 712a and the first rearward airflow 712b.

The fluid dynamics around the second propeller blade 710 are similar to the fluid dynamics around the first propeller blade 708 near the propeller hub 706 and are dissimilar near the tip of the first and second propeller blades 708, 710. For example, a third forward airflow 716a is pulled towards the second propeller blade 710 and a third rearward airflow 716b is expelled rearward from the second propeller blade 710, the third rearward airflow 716b being a continuation of the third forward airflow 716a. The air continues to resist pressure differentials, thus the second propeller blade 710 is pushed towards the low pressure area by the air trying to equalize in pressure. Thus the third forward and rearward airflows 716a, 716b are similar to the first forward and rearward airflows 712a, 712b. However, unlike the first forward and rearward airflows 714a, 714b, the obstruction 702 is positioned at a side position that interferes with the fluid dynamics at a side of the second propeller blade 710 away from the propeller hub 706. A fourth forward airflow 718a is further from the propeller hub than the third forward airflow 716a and parallels the third forward airflow 716a. The obstruction 702 interferes with formation of a low pressure area to the side of the second propeller blade 710, preventing or minimizing the formation of a vortex at the tip of the second propeller blade 710. Thus the fourth rearward airflow is formed further from the propeller hub than the third rearward airflow 716b and parallels the third rearward airflow 716b. This phenomenon is sometimes referred to as ground effect when referring to the added lift from wing tip vortices reaching the ground at low altitudes.

The pressure differential created by the disparate flows at the tips of the first and second propeller blades 708, 710 causes uneven forces. Each blade of the first and second propeller blades 708, 710 can be modeled as a cantilever beam to depict the rotational forces generated with respect to the propeller hub 706. Typically, propellers are placed in symmetrical patterns around the propeller hub 706 so that any rotational forces produced by a specific blade are offset by one or more opposing blades. In FIG. 7, the first propeller blade 708 is positioned opposite to the second propeller blade 710. If the obstruction 702 were removed, the forces generated by the first and second propeller blades 708, 710 would cause equally opposing rotational forces or torques on the propeller. The rotational forces would cancel out and only the shear force normal to the surface of the model cantilever beam would remain, pushing the propeller hub in a direction opposite to the airflows.

Because of the presence of the obstruction 702, the rotational forces produced the first and second propeller blades 708, 710 are not equal and opposite to cancel each other out. In particular, because less energy is lost by the second propeller blade 710, more rotational force is generated, thus a net rotational force is generated at the propeller hub and the motor 704 the propeller hub 706 is connected to, as is shown by the rotational torque 720.

Also shown in FIG. 7 are alternative positions of the obstruction 702. The obstruction 702 is in a forward position 702b that is in front of the second propeller blade 710 in one embodiment. While the fluid dynamics will be different than those shown in FIG. 7, the obstruction 702 in the forward positon 702b will also generate an imbalance in the opposing rotational forces from the first and second propeller blades 708, 710. This imbalance of rotational forces is caused by the obstruction 702 blocking ambient fluid from filling the low pressure area forward of the second propeller blade 710, lowering the pressure further and increasing the pressure differential between the area forward of the second propeller blade 710 and the area rearward from the second propeller blade 710.

Similarly, the obstruction 702 is in a rear position 702c behind the second propeller blade 710. Again, the fluid dynamics will be different than those shown in FIG. 7; however, the obstruction 702 in the rear positon 702c will also generate an imbalance in the opposing rotational forces from the first and second propeller blades 708, 710. The imbalance of rotational forces is caused by the obstruction 702 blocking ambient fluid from vacating the high pressure area rearward from the second propeller blade 710, raising the pressure further and increasing the pressure differential between the area forward of the second propeller blade 710 and the area rearward from the second propeller blade 710.

The obstruction 702 is also shown having an alternate position of canted position 702d in which the obstruction 702 is between the side position 702a and the forward position 702b. The fluid dynamics will be a combination of dynamics discussed with respect to the obstruction 702 being in the side position 702a and the forward position 702b. Similarly, the fluid dynamics will be in an imbalance from different pressure differentials across the first and second propeller blades 708, 710.

Rotational torque 720 impacts the overall operating dynamics of the vehicle system 100, which manifests in the vehicle system 100 rolling, pitching, or experiencing instability and turbulent operating behavior. To maintain control of the vehicle system 100, one option is to reduce the power of the motor 704. In some cases this reduces the dependence on the motor for stability. In other case the reduced power is reduced to compensate for the added forces by the rotational torque 720 so that the net forces on the vehicle system from the motor 704 stays approximately constant.

Figure 8A:
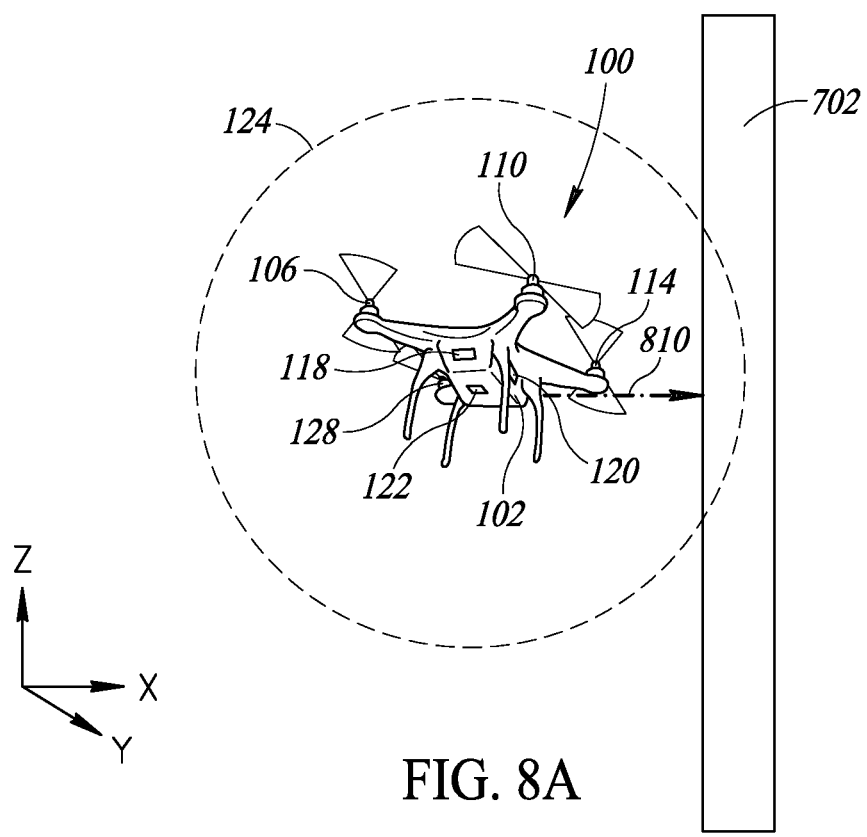
FIG. 8A is a perspective view of a vehicle system in proximity to an obstacle.

FIG. 8A is a perspective view of the vehicle system 100 in proximity to the obstacle 702 that demonstrates the obstacle compensation system detecting an obstruction inside a threshold boundary. The threshold distance for this vehicle is the radius of the threshold boundary 124. As discussed herein, there may be multiple threshold distances associated with each of the ranging sensors. These distances may vary based on the location on the vehicle of the sensor. For example, a threshold distance for the bottom surface of the vehicle may be a different distance from a threshold distance from a side surface with different fluid dynamics occurring at these locations.

The vehicle system 100 is shown at a distance 810 from the obstruction 702, which is less than the threshold distance as depicted by the obstruction being inside the threshold boundary 124. The distance 810 is measured from the center of the vehicle system 100. In alternate embodiments the distance 810 is measured from the center of any of the propulsion motors, or from any other point, relative to the vehicle system 100 or not. Alternatively, the distance 810 is more than one value a time (e.g., an array of distance values), with the distance 810 being measured from more than one origin or to more than one point on the obstruction 702. In some embodiments, the distance 810 is measured from the same location or locations of the origin as the threshold boundary 124.

In FIG. 8A, the obstruction 702 is positioned within the threshold boundary 124. The obstruction 702 is closest to the third propulsion motor 114 and furthest from the first propulsion motor 106. The second and fourth propulsion motors 110, 128 are each at a distance from the obstruction 702 that is greater than the distance between the obstruction 702 and the third propulsion motor 114, but less than the distance between the obstruction 702 and the first propulsion motor 106. These distance differences are reflected in the graph of FIG. 8B in which the different power curves have different offsets from the Y axis.

Figure 8B:
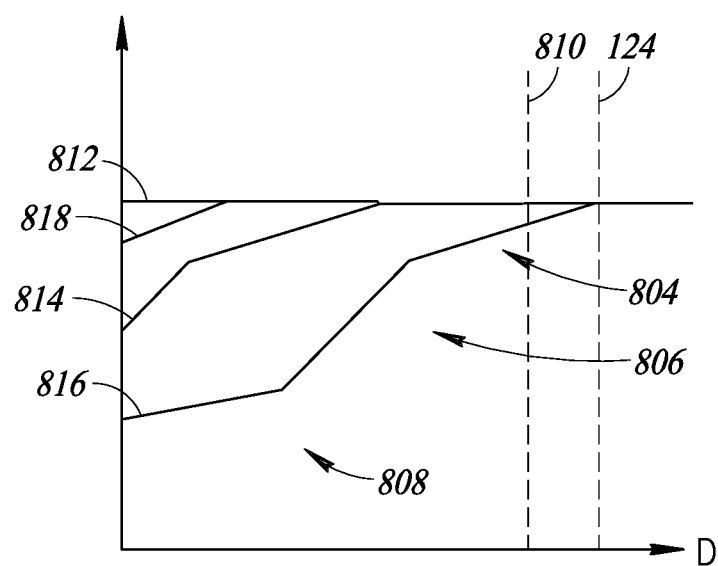
FIG. 8B is a graph of commands to respective propulsion motors of the vehicle system of FIG. 8A.

FIG. 8B is a graph of commands to respective propulsion motors of the vehicle system 100 of FIG. 8A. The graph depicts the control signals as part of a method of controlling the vehicle system 100. The second ranging sensor 120 transmits and receives a ranging signal reflected off of the obstruction 702 which has penetrated the threshold boundary 124. The time of flight of the ranging signal is calculated and equated to a distance D. The distance D is then sent to a controller as a distance signal and the controller compares the threshold distance to the distance signal. Alternatively, the controller calculates time of flight and equates that to a distance D. If the distance signal is less than the threshold distance the controller commands a change in the power setting of at least one of the propulsion motors based on their position relative to the obstruction 702. This compensates for the rotational torque 720 generated in any one of the propeller motors by the proximity of the obstruction 702, as depicted in FIG. 7. Various embodiments of determining the change in the power setting are discussed in further detail below.

The graph in FIG. 8B has a Y axis that represents the value of a motor control signal, the value increasing from zero to some value greater than zero, in one embodiment. In some embodiments, the motor control signal is a power signal. A power signal can vary in voltage or current, in pulse width, or in other ways to control the amount of energy transferred to a motor to control its output. In other embodiments, the motor control signal is a command signal that is interpreted by a motor. Examples of a command signal include an rpm value setting or a power value setting. The command signal is a true signal or a function of a true signal in some embodiments, such as a scaled and offset command signal.

The X axis of the graph shown in FIG. 8B is the distance D between the vehicle system 100 and the obstruction 702. The X axis has a value increasing from zero to some value greater than zero in one embodiment. The graph of FIG. 8B assumes that the obstruction 702 is in the side position 702a and only varies the distance between the vehicle system 100 and the obstruction 702 along the X axis of FIG. 8A, without varying the orientation in the Y or Z axis of FIG. 8A. Also depicted on the graph of FIG. 8B are two vertical lines, one defining the threshold boundary 124 along the line of the distance 810, or the threshold distance, and the other being the distance 810, as depicted in FIG. 8A.

The data plotted in the graph thus represents the motor control signal for the first propulsion motor 106 with a first control signal 812, the second propulsion motor 110 with a second control signal 814, the third propulsion motor 114 with a third control signal 816, and the fourth propulsion motor 128 with a fourth control signal 818. The first, second, third, and fourth control signals 812, 814, 816, 818 decrease after the distance D falls below the threshold boundary 124. Because the third propulsion motor 114 is closest to the obstruction 702, the third control signal 816 starts decreasing at a higher distance D than the second control signal 814. Because a distance between the first propulsion motor 106 and the third propulsion motor 114 along the distance D line is greater than the threshold boundary 124, the first control signal 812 does not decrease for any value of the distance D in FIG. 8B. If the obstruction 702 were positioned on the opposite side of the vehicle system 100, then the first control signal 812 and the third control signal 816 would resemble the other on the graph, with the first propulsion motor 106 having the a motor control signal decreasing at the higher distance D as now the first propulsion motor 106 would be closest to the obstruction 702 and the first to experience turbulent airflow dynamics. Thus, the motor control signal is a function of both the position of the obstruction 702 and the distance D.

Many different functions can be used to describe the relationship of the motor control signal to the distance D. In some embodiments a Heaviside function is used in which a first motor control setting is constant above a particular value of the distance D and constant including and below the particular value of the distance D, with an instantaneous change at the particular value of the distance D. In some embodiments the distance D changes at the threshold value or some lesser value based on position of the obstruction 702 relative to the vehicle system 100. In other embodiments the motor control signals and the distance D are linear functions of one another. And in yet other embodiments, the motor control signals and the distance D are polynomial functions of one another. In one embodiment, the motor control signal and distance D are functionally related by any function, currently known or unknown.

As can be appreciated from FIG. 8B, the relationship of the motor control signal to distance D is segmented into stages in one embodiment. In a first stage 804 of the third control signal 816 the motor control signal decreases linearly at a first rate with respect to distance D starting at the threshold boundary 124. This stage includes the distance 810. Thus, at the position shown in FIG. 8A, the third propulsion motor 114 will receive the motor control signal shown at the intersection of the third control signal 816 and the distance 810, slightly below the maximum value it reaches above the threshold boundary 124. At a second stage 806 of the third control signal 816 the motor control signal decreases linearly at a second rate with respect to distance D. The second rate is a smaller rate than the first rate. Then at a third stage 808 of the third control signal 816 the motor control signal decreases linearly at a third rate with respect to distance D. The third rate is greater than the second rate and approximately equal to the first rate. In the embodiment shown in FIG. 8B the third stage 808 at distance D of zero has a motor control signal value greater than zero. Thus, even when the obstruction 702 is at a distance D of zero the third control signal 816 is driving the third propulsion motor 114 at a speed above zero.

In the embodiment shown in FIG. 8B, the second and fourth control signals 814, 818 follow the same pattern as the third control signal 816, but each with a distance offset. The distance offset is from the difference in the positions of the second propulsion motor 110 from the position of the third propulsion motor 114 along a line through the distance D in one embodiment. In other embodiments, the offset is calculated from other data. As depicted in FIG. 8B, because of the offset, the second control signal 814 enters a second stage 806, but then terminates at a distance D of zero, whereas the fourth control signal 818 never leaves the first stage 804.

In FIG. 8B the first control signal 812 never enters the first stage 804. As previously discussed, the first propulsion motor 106 is a distance from the third propulsion motor 114 greater than the threshold distance. Thus, the first motor controller is never directed to decrease a value of the motor control signal because of the obstruction 702 being in the position shown in FIG. 8A.

In some embodiments the differences between the first, second, third, and fourth control signals 812, 814, 816, 818 are more than an offset in the X direction. In some embodiments the functional relationships are affected by the various parts of the vehicle system 100 interacting with the fluid dynamics together with the obstruction 702.

The segmentation of the functional relationship between the motor control signal and the distance D is possible at any level. In one embodiment there is no segmentation. In another embodiment the segmentation occurs at each discernible value of distance D such that the motor control signal and the distance D are related through a lookup table.

In some embodiments, in place of or in addition to controlling the motor control signals based on a distance D, the obstacle compensation system enters into an autopilot mode when an obstruction penetrates the three dimensional shape of the threshold boundary 124. In some embodiments, an autopilot controller (not shown) is included in the vehicle system 100 to provide this functionality. The autopilot controller provides functionality to avoid the obstruction by redirecting the movement of the vehicle system 100 in one embodiment. In another embodiment, the autopilot controller provides functionality to automatically land the vehicle system 100. Other functionality is possible by the autopilot system based on programmed responses to various detected obstructions and their positions.

In other embodiments, in place of or in addition to controlling the motor control signals based on a distance D, the obstacle compensation system provides a warning or other indication to a pilot or control system of the vehicle system 100 when an obstruction penetrates the three dimensional shape of the threshold boundary 124. A warning or indication is auditory, visual, haptic, or some other type of warning or indication. The warning or indication is provided by the obstacle compensation system directly, or is signaled by the obstacle compensation system for another system to provide the warning or indication.

Figure 9A:
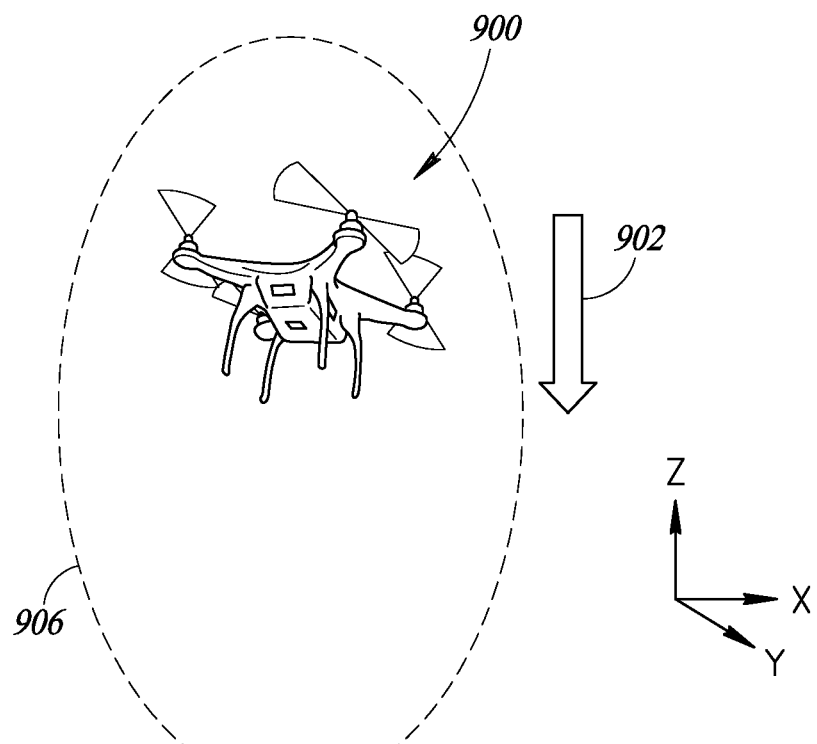
FIGS. 9A and 9B are exemplary configurations of the detection threshold based on movement of the vehicle system.
Figure 9B:
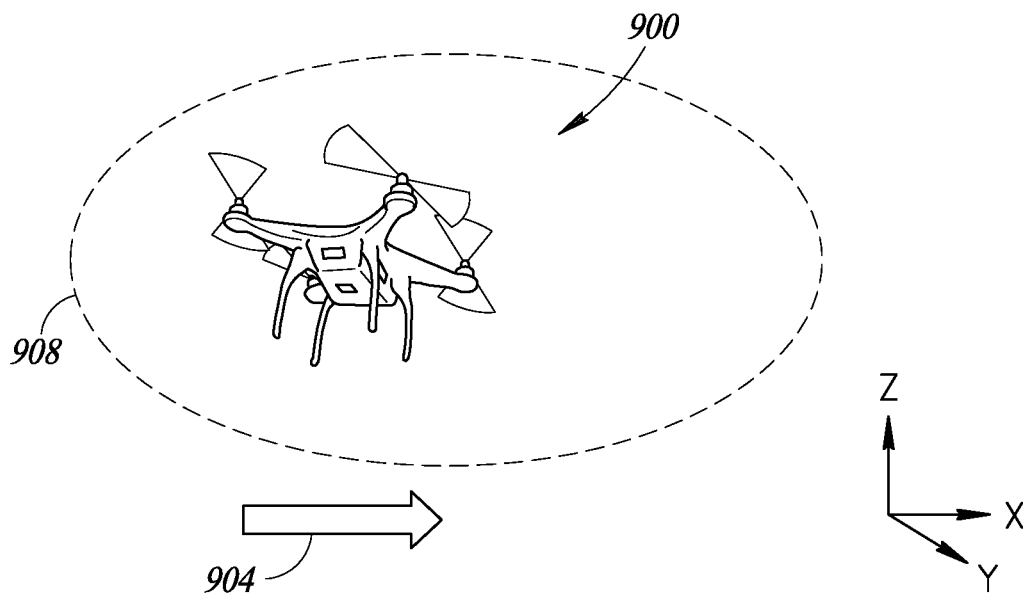

FIGS. 9A and 9B are exemplary configurations of the detection threshold based on movement of the vehicle system. FIG. 9A depicts a vehicle system 900 moving in a direction of the first velocity vector 902. In one embodiment the vehicle system 900 is the same as vehicle system 100. In other embodiments the vehicle system 900 can be any of the types of vehicles discussed previously. The first velocity vector 902 is parallel to the Z axis, with a negative magnitude that indicates that the vehicle system 900 is losing elevation. In one embodiment, the decrease in elevation is a result of a decrease in upward thrust provided by the propulsion motors. In another embodiment, the decrease in elevation of the vehicle system 900 is due to a reversal in the direction of the thrust provided by the propulsion motors. In yet another embodiment the decrease in elevation is due to causes independent of the thrust from the propulsion motors, such as a change in weight of the vehicle system 900 or a change in the environmental conditions around the vehicle system 900.

As the vehicle system 900 accelerates to a velocity shown by the first velocity vector 902, the threshold boundary changes. In the embodiment shown in FIG. 9A, the downward first velocity vector 902 causes the threshold boundary 906 to stretch out in the downward direction. The stretching of the threshold boundary 906 compensates for the delay between detection of an obstruction, adjustment of the motor control signals, and changes to the power output of the propulsion motors of the vehicle system 900. In some embodiments the threshold boundary 906 increases in every direction as velocity increases in any single direction, but in the embodiment shown in FIG. 9A the threshold distance is adjusted primarily in the direction of the first velocity vector 902, with only a minimal impact in directions orthogonal to the direction of the first velocity vector 902 and in a direction opposite the first velocity vector 902. In some embodiments the stretched threshold boundary 906 resembles an ellipsoid.

FIG. 9B depicts the vehicle system 900 moving in a direction of the second velocity vector 904. The second velocity vector 904 is parallel to the X axis, with a positive magnitude that indicates that the vehicle system 900 is translating to the right. In one embodiment, the translation is a result of thrust along the X axis provided by the propulsion motors. In another embodiment the translation is due to causes independent of the thrust from the propulsion motors, such as a change in the environmental conditions around the vehicle system 900.

As the vehicle system 900 accelerates to velocity shown by the second velocity vector 904, the threshold boundary changes. In the embodiment shown in FIG. 9B, the sideways second velocity vector 904 causes the threshold boundary 908 to stretch out in a lateral direction. The stretching of the threshold boundary 908 compensates for the delay between detection of an obstruction, adjustment of the motor control signals, and changes to the power output of the propulsion motors of the vehicle system 900. In FIG. 9B the threshold boundary 908 is adjusted primarily in the direction of the second velocity vector 904, with only a minimal impact in directions orthogonal to the direction of the second velocity vector 904 and in a direction opposite the second velocity vector 904. In some embodiments the stretched threshold boundary 908 resembles an ellipsoid. The stretching of the threshold boundary 908 compensates for time lost, and thus distance covered, during the determining of proximity of an obstruction, so as to anticipate the obstruction causing turbulence in a propulsion motor.

Figure 10A:
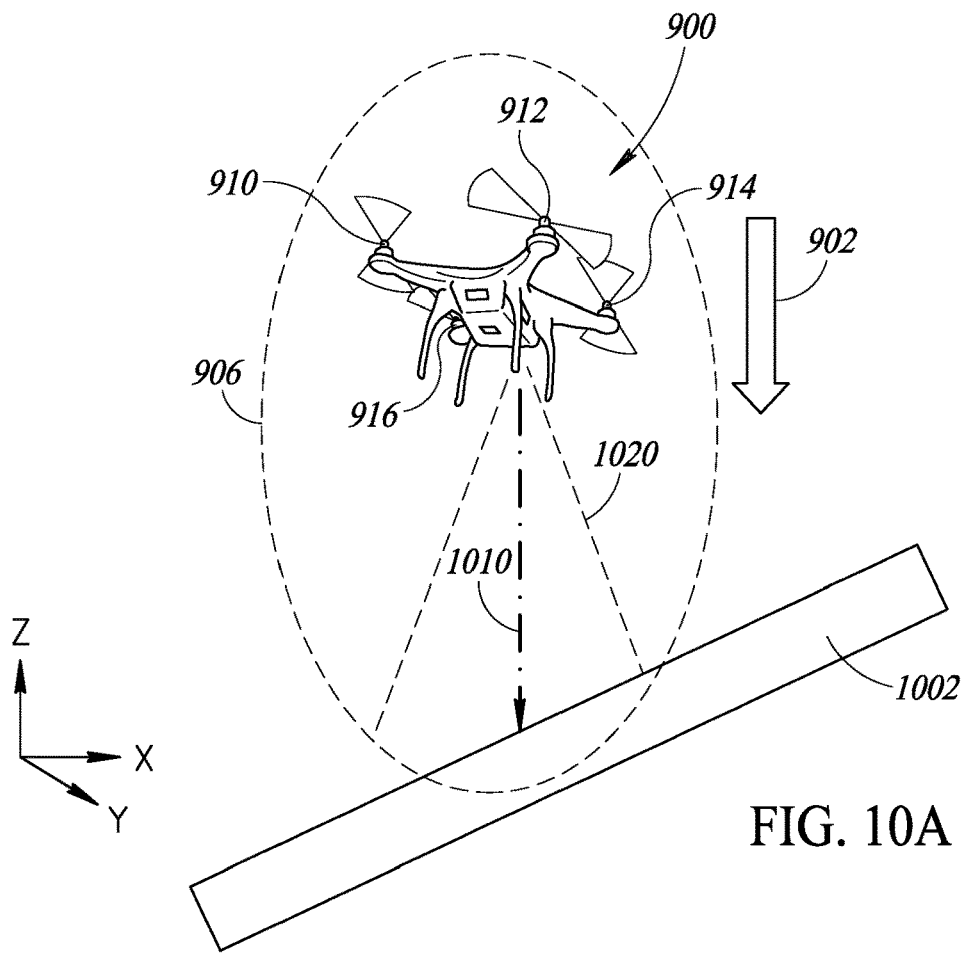
FIG. 10A is a perspective view of a moving vehicle system in proximity to an obstacle.

FIG. 10A is a perspective view of a moving vehicle system in proximity to an obstacle. The vehicle system is shown at a distance 1010 from an obstruction 1002, which is less than the threshold distance. In one embodiment, the obstruction 1002 is similar to the obstruction 702, but in a position below and angled with respect to the vehicle system 900. In other embodiments the obstruction 1002 is any object which interferes with the fluid dynamics of the vehicle system 900. The distance 1010 is measured from the center of the vehicle in one embodiment. In other embodiments the distance 1010 is measured from the center of the motor or from any other point, relative to the vehicle system 900 or not. Alternatively, the distance 1010 is more than one value at a time, being measured from more than one origin or to more than one point on the obstruction 1002. In some embodiments, the distance 1010 is measured from the same location or locations of the origin as the threshold boundary 906.

In FIG. 10A, the obstruction 1002 is positioned within the threshold boundary 906. The obstruction 1002 is closest to a third propulsion motor 914 and furthest from a first propulsion motor 910. A second propulsion motor 912 and a fourth propulsion motor 916 are at a distance from the obstruction 1002 that each is greater than the distance between the obstruction 1002 and the third propulsion motor 914, but is less than the distance between the obstruction 1002 and the first propulsion motor 910. Because of the position of the obstruction 1002 relative to the vehicle system 900, the differences in distances between the propulsion motors and the obstruction 1002 is smaller than the differences in distances between the propulsion motors and the obstruction 702 as depicted and described in FIGS. 8A and 8B. The distance differences are reflected in the differences of the graphs shown in FIGS. 8B and 10B in which the motor control signals have smaller offsets along the X axis as each motor will be impacted by the obstruction 1002 over smaller distance variations that those shown in FIG. 8b. Also depicted in FIG. 10A is the field of view 1020 of one of the multi-zone ranging sensors. Distance 1010 reflects the distance detected in a single zone. However, in this embodiment the multi-zone sensor is simultaneously reporting distances for the other zones of the sensor. The discussion of the processing of the distance 1010 by the obstacle compensation system is also occurring for the other zones. In one embodiment, the minimum distance is the only controlling signal. In other embodiments the obstacle compensation system blends solutions based on the various distances reported by the multi-zone sensor or by more than one sensor.

Figure 10B:
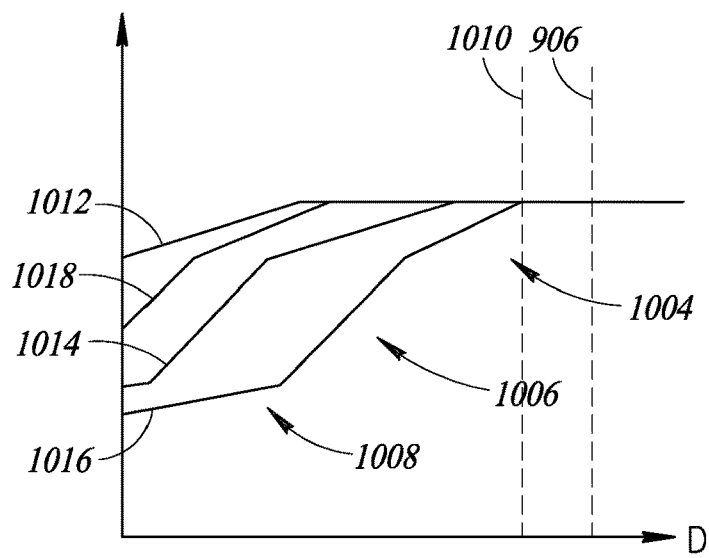
FIG. 10B is a graph of commands to respective propulsion motors of the vehicle system of FIG. 10A.

FIG. 10B is a graph of commands to respective propulsion motors of the vehicle system of FIG. 10A. The graph has a Y axis that represents the value of the motor control signal, the value increasing from zero to some value greater than zero in one embodiment. The nature of the motor control signals is similar to the various embodiments discussed above with respect to FIG. 8B.

The X axis of the graph shown in FIG. 10B is a distance D between the vehicle system 900 and the obstruction 1002. The X axis has a value increasing from zero to some value greater than zero in one embodiment. The graph of FIG. 10B assumes that the obstruction 1002 is positioned as shown in FIG. 10A and only varies the distance between the vehicle system 900 and the obstruction 1002 along the Z axis of FIG. 10A, without varying the orientation in the X or Y axis of FIG. 10A. Also depicted on the graph of FIG. 10B are two vertical lines, one defining the threshold boundary 906 along the line of the distance 1010, and the other being the distance 1010, as depicted in FIG. 10A.

The data plotted in the graph thus represents the motor control signal for the first propulsion motor 910 with a first control signal 1012, the second propulsion motor 912 with a second control signal 1014, the third propulsion motor 914 with a third control signal 1016, and the fourth propulsion motor 916 with a fourth control signal 1018. The first, second, third, and fourth control signals 1012, 1014, 1016, 1018 decrease after the distance D falls below the threshold distance. Because the third propulsion motor 914 is closest to the obstruction 1002, the third control signal 1016 starts decreasing at a higher distance D than the second control signal 1014. Because the second propulsion motor 912 is closer to the obstruction 1002 than the fourth propulsion motor 916, the second control signal 1014 starts decreasing at a higher distance D than the fourth control signal 1018. And because the fourth propulsion motor 916 is closer to the obstruction 1002 than the first propulsion motor 910, the fourth control signal 1018 starts decreasing at a higher distance D than the first control signal 1012. Since a distance between the first propulsion motor 910 and the third propulsion motor 914 along the distance D line is less than the threshold distance, the first control signal 1012 does decrease for some values of the distance D in FIG. 10B. If the obstruction 1002 were positioned on the opposite side of the vehicle system 900, then first control signal 1012 and the third control signal 1016 would resemble the other on the graph, with the first propulsion motor 910 having the a motor control signal decreasing at the higher distance D. Thus, the motor control signal is a function of both the position of the obstruction 1002 and the distance D.

As described above with respect to FIG. 8B, many different functions can be used to describe the relationship of the motor control signal to the distance D in FIG. 10B.

As can be appreciated from FIG. 10B, the relationship of the motor control signal to distance D is segmented into stages in one embodiment. In a first stage 1004 of the third control signal 1016 the motor control signal decreases linearly at a first rate with respect to distance D starting at the threshold boundary 906. This stage includes the distance 1010. Thus, at the position shown in FIG. 10A, the third propulsion motor 914 will receive the motor control signal shown at the intersection of the third control signal 1016 and the distance 1010, slightly below the maximum value it reaches above the threshold boundary 906. At a second stage 1006 of the third control signal 1016 the motor control signal decreases linearly at a second rate with respect to distance D. The second rate is a smaller rate than the first rate. Then at a third stage 1008 of the third control signal 1016 the motor control signal decreases linearly at a third rate with respect to distance D. The third rate is greater than the second rate and approximately equal to the first rate. In the embodiment shown in FIG. 10B the third stage 1008 at distance D of zero has a motor control signal value greater than zero. Thus, even when the obstruction 1002 is at a distance D of zero the third control signal 1016 is driving the third propulsion motor 914 at a speed above zero.

In the embodiment shown in FIG. 10B, the second control signal 1014 follows the same pattern as the third control signal 1016 with a distance offset. The distance offset is from the difference in the positions of the second propulsion motor 912 from the position of the third propulsion motor 114 in one embodiment. In other embodiments, the offset is calculated from other data.

Also in the embodiment shown in FIG. 10B, the first and fourth control signals 1012, 1018 follow the same pattern as the third control signal 1016 with a distance offset. The distance offset is from the difference in the positions of the first propulsion motor 910 and the fourth propulsion motor 916 from the position of the third propulsion motor 914. Also, because of the offset, the first control signal 1012 only enters a first stage 1004 and the fourth control signal only enters a second stage 1006, but both then terminate at a distance D of zero.

In some embodiments the differences between the first, second, third, and fourth control signals 1012, 1014, 1016, 1018 are more than an offset in the X direction. In some embodiments the functional relationships are affected by the various parts of the vehicle system 900 interacting with the fluid dynamics together with the obstruction 1002.

The segmentation of the functional relationship between the motor control signal and the distance D is done to any level. In one embodiment there is no segmentation. In another embodiment the segmentation occurs at each discernible value of distance D such that the motor control signal and the distance D are related through a lookup table.

Figure 11:
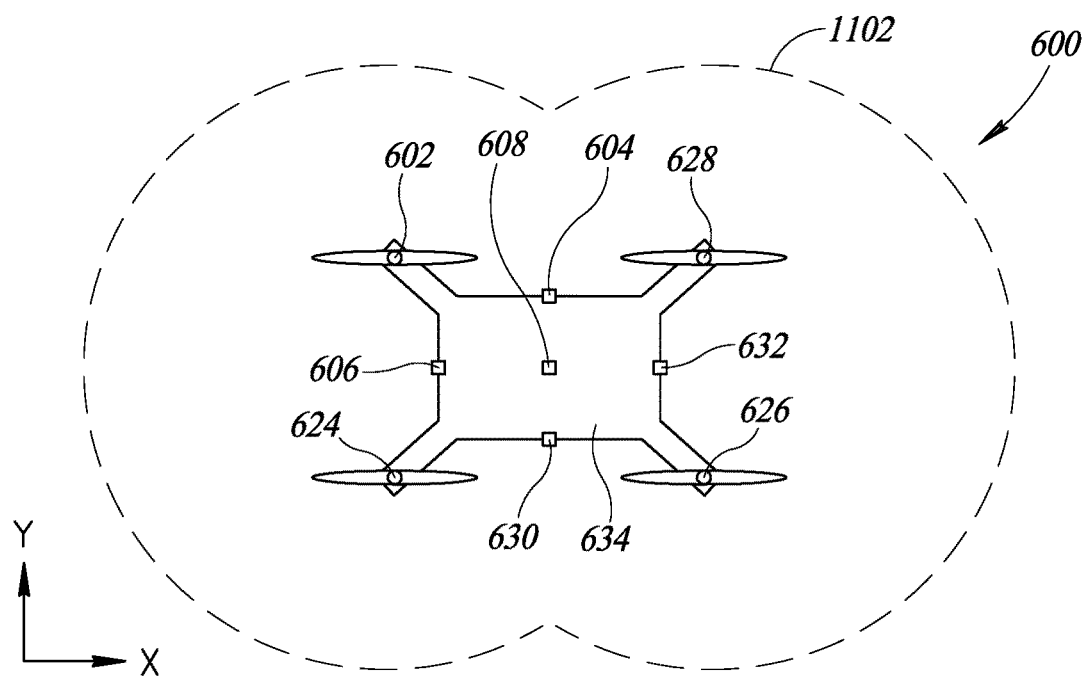
FIG. 11 is a plan view of an alternate embodiment illustrating a selected threshold boundary.

FIG. 11 is a plan view of an alternate embodiment of the threshold distance. In this embodiment the threshold boundary 1102 resembles two overlapping spheres or columns. A center of the first sphere or column is between the first propulsion motor 624 and the fourth propulsion motor 602. A center of the second sphere or column is between the second propulsion motor 626 and the third propulsion motor 628. The first and second spheres or columns overlap to form the three dimensional shape of the threshold boundary 1102 that encapsulates the vehicle system 600. The response by the vehicle system 600 to detecting an obstruction with the threshold boundary 1102 is any of the responses discussed above, such as the ones discussed with respect to FIG. 8B in which motor power is reduced due to variations in forces generated. Additionally, in one embodiment the shape and size of the threshold boundary 1102 varies as the vehicle system 600 moves or changes its relationship with the objects around it.

Figure 12:
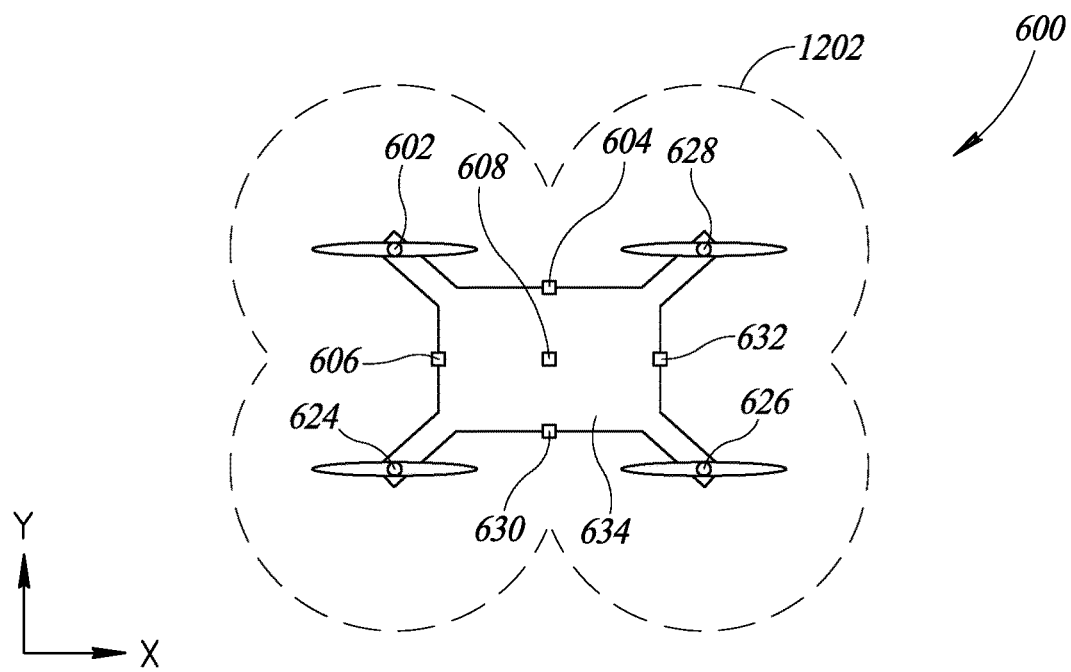
FIG. 12 is a plan view of an alternate embodiment illustrating a selected threshold boundary.

FIG. 12 is a plan view of another alternate embodiment of the threshold distance. In this embodiment the threshold boundary 1202 resembles four overlapping spheres or columns. A center of each of the sphere or columns is at one of the first propulsion motor 624, the second propulsion motor 626, the third propulsion motor 628, and the fourth propulsion motor 602. The spheres or columns overlap to form the three dimensional shape of the threshold boundary 1202 that encapsulates the vehicle system 600. The response by the vehicle system 600 to detecting an obstruction with the threshold boundary 1202 is any of the responses discussed above, such as the ones discussed with respect to FIG. 8B in which motor power is reduced due to variations in forces generated. Additionally, in one embodiment the shape and size of the threshold boundary 1202 varies as the vehicle system 600 moves or changes its relationship with the objects around it.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle system for movement in fluid, comprising:
a main body having a first surface and a second surface that are transverse to each other;
a plurality of photon detection devices, including a first photon detection device, coupled to the first surface, being sensitive to a first direction, and a second photon detection device, coupled to the second surface, being sensitive to a second direction, the first direction being different from the second direction, each photon detection device having a single photon avalanche diode array configured to output a distance value;
a controller configured to receive the distance values from the plurality of photon detection devices, the controller configured to output at least one control signal in response to at least one of the distance values being less than or equal to a threshold distance; and
a plurality of fluid motors coupled to the controller and the main body, the controller configured to adjust a power setting of at least one of the plurality of fluid motors in response to the at least one control signal.

2. The system of claim 1, further comprising:
a movement detector configured to detect a direction of movement and to output a movement and direction signal to the controller, the controller configured to adjust the threshold distance corresponding to one of the photon detection devices based on the movement and direction signal.

3. The system of claim 2 wherein the threshold distance defines a three dimensional threshold boundary around the system, the threshold boundary being approximately a sphere around the system when stationary and approximately an ellipsoid around the system when moving.

4. The system of claim 1 wherein the controller is configured to adjust a power setting of a first one of the plurality of fluid motors in response to one of the plurality of photon detection devices detecting the object within the threshold distance and is configured to adjust a power setting of a second one of the plurality of fluid motors in response to the one of the plurality of photon detection devices detecting an object within the threshold distance minus a distance equal to a distance between the first one and the second one of the plurality of fluid motors along an axis parallel to a line between the center of the system and the object.

5. The system of claim 1 wherein the power setting of the at least one of the fluid motors in the plurality of fluid motors decreases as a function of a distance of penetration within the threshold distance by the object.

6. The system of claim 5 wherein the decrease of the power setting as a function of a distance of penetration within the threshold distance by the object is nonlinear.

7. The system of claim 1, further comprising:
an autopilot controller, the autopilot controller configured to be activated in response to one of the plurality of photon detection devices detecting the object within the threshold distance.

8. A device, comprising:
a first ranging sensor having a first field of view, the first ranging sensor including a first array of diodes, the first ranging sensor configured to output a first plurality of distance measurements from the first array of diodes;
a second ranging sensor having a second field of view, the second field of view being different from the first field of view, the second ranging sensor including a second array of diodes, the second ranging sensor configured to output a second plurality of distance measurements from the second array of diodes;
a motor controller configured to receive the first plurality of distance measurements from the first ranging sensor and the second plurality of distance measurements from the second ranging sensor;
a first fluid propulsion motor configured to receive a first power setting from the motor controller, the motor controller configured to adjust the first power setting in response to the first plurality of distance measurements; and
a second fluid propulsion motor configured to receive a second power setting from the motor controller, the motor controller configured to adjust the second power setting in response to the second plurality of distance measurements.

9. The device of claim 8, wherein the motor controller is further configured to adjust the second power setting in response to the first plurality of distance measurements and adjust the first power setting in response to the second plurality of distance measurements.

10. The device of claim 8 wherein a value of the first power setting is different than a value of the second power setting.

11. The device of claim 8, wherein the value of the first power setting decreases proportionally with the decrease in the value of the first plurality of distance measurements and the value of the second power setting decreases proportionally with the decrease in the value of the second plurality of distance measurements.

12. The device of claim 8 wherein the first and second sensors are part of a plurality of ranging sensors and ones of the plurality of ranging sensors have overlapping fields of view such that the combined field of view of the plurality of ranging sensors is approximately a spheroid.

13. The device of claim 8 wherein the first ranging sensor includes a laser sensor with a laser light emitter, a laser light detector configured to detect reflections of a light from the laser light emitter, and a timing circuit configured to determine a time of flight of the light from the laser light emitter to the laser light detector and the first array of diodes is an array of single photon avalanche diodes.

14. The device of claim 13, wherein the first ranging sensor includes a beam steering system, the beam steering system configured change the direction of the light from the laser light emitter.

15. The device of claim 13, wherein the laser light detector includes a plurality of light detectors, each one of the plurality of light detectors configured to detect reflections of a light from the laser light emitter coming from a different direction.

16. The device of claim 8 wherein the motor controller is configured to detect that a value of the first plurality of distance measurements has fallen below a threshold.

17. The device of claim 16, further comprising:
a movement detector configured to send a movement signal to the motor controller, the motor controller configured to change the threshold in response to the movement signal.

18. The device of claim 17 wherein the threshold defines a three dimensional threshold boundary, the threshold boundary being approximately a spheroid around the device, the motor controlled configured to change the threshold boundary in a first direction corresponding to a direction of the movement signal and to not change the threshold boundary in a second direction orthogonal to the first direction.

19. The device of 16, further comprising:
an autopilot controller, the autopilot controller configured to be activated in response to the value of the first plurality of distance measurements being less than the threshold.

20. The device of claim 8 wherein the value of the first power setting decreases as the value of the first plurality of distance measurements decreases.

21. The device of claim 20 wherein the decrease of the power setting is linear with respect to the decrease of the first plurality of distance measurements.

22. A method of controlling a vehicle in a fluid, comprising:
transmitting a first ranging signal using a first light source in a first ranging sensor;
receiving the first ranging signal using a first photon detector in the first ranging sensor, the first photon detector coupled to a first surface of a main body of the vehicle, the first photon detector having a single photon avalanche diode array;
determining a distance between the vehicle and an object from a time between the transmitting and receiving of the first ranging signal using a delay detection circuit in the first ranging sensor;
comparing the distance with a first threshold value;
adjusting a power setting of a first motor in the vehicle in response to the distance being less than the first threshold value;
transmitting a second ranging signal using a second light source in a second ranging sensor; and
receiving the second ranging signal using a second photon detector in the a second ranging sensor, the second photon detector coupled to a second surface of the main body, the second surface being transverse to the first surface, the second photon detector having a single photon avalanche diode array.

23. The method of claim 22, further comprising:
changing the first threshold value as a function of the speed of the vehicle along an axis parallel to the beam path of the first ranging signal using a controller.

24. The method of claim 22, wherein the second ranging signal is transmitted in a direction orthogonal to the first ranging signal.

25. The method of claim 22, further comprising:
changing the first threshold value as a function of the speed of the vehicle along an axis parallel to the beam path of the first ranging signal using a controller; and
changing a second threshold value as a function of the speed of the vehicle along an axis parallel to the beam path of the second ranging signal using the controller.

26. The method of claim 22, further comprising:
adjusting a power setting of a second motor in the vehicle using a controller in response to the distance being less than the first threshold value, wherein the power setting of the first motor is different than the power setting of the second motor.

27. The method of claim 22, further comprising:
engaging a vehicle autopilot using a controller in response to the distance being less than the first threshold value.

* * * * *